2,485,929

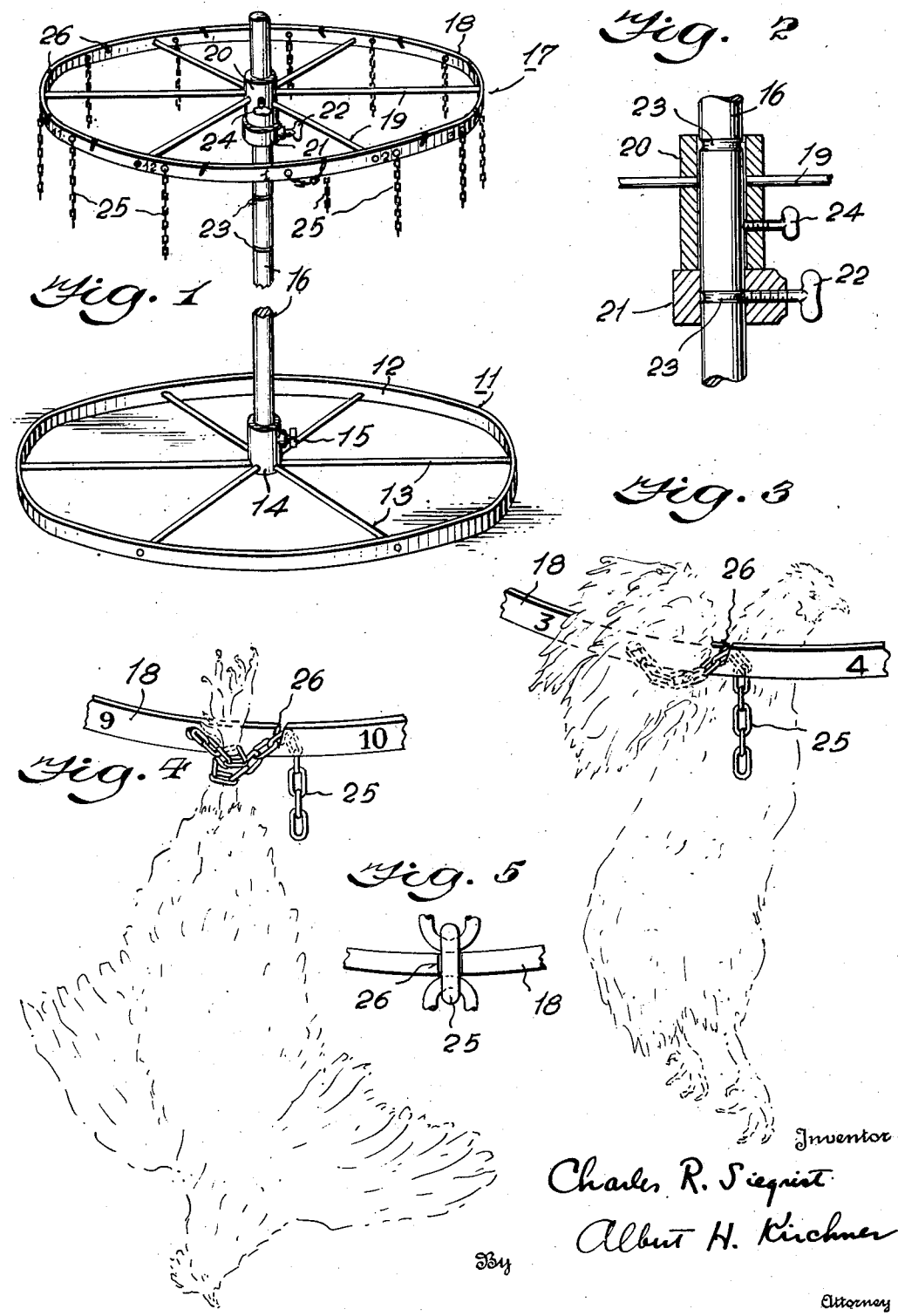
Oct. 25, 1949.  C. R. SIEGRIST  2,485,929
HOLDING DEVICE FOR POULTRY AND THE LIKE
Filed May 24, 1945
Inventor
Charles R. Siegrist
Albert H. Kirchner
By
Attorney Patented Oct. 25, 1949

UNITED STATES PATENT OFFICE 2,485,929

HOLDING DEVICE FOR POULTRY AND THE LIKE

Charles R. Siegrist, Huron, S. Dak.

Application May 24, 1945, Serial No. 595,507

2 Claims. (Cl. 17—44.1)

The present invention provides a device for holding live poultry and the like for the performance of various surgical, therapeutic, sanitary and similar operations, and embodiments of the invention are useful also to hold live poultry in position for killing and to hold killed poultry in position for dressing.

A principal object of the invention is to provide a simple and inexpensive structure on which a live or killed fowl, or a plurality of them, may be readily secured temporarily in either of two convenient operating positions, at a minimum of inconvenience and labor on the part of the operator, and with a maximum of safe and harmless restraint of the fowl.

Another object is to provide a holding device of the character indicated which can be used efficiently by a plurality of persons working together, and to this end it includes a fowl-holding support which can be rotated in a horizontal plane between a loading and unloading station and an operating station, each manned by a different operator.

Further objects include providing a durable and foolproof construction the use of which requires no special skill or experience and which will have numerous advantages as will be apparent to those skilled in the art from the present description of a preferred embodiment.

In the production of poultry it becomes necessary at times to handle the individual fowl for various treatments. A partial list of such treatments would include blood and tuberculin testing, vaccinating, deworming, delousing, banding, crop injection, administering dosages of medicine by mouth or rectally, various types of examination and injection, caponizing and artificial insemination.

In all these and other related operations, the live fowl must be held quite motionless in the right position, which is generally upright or upside down. Many of these operations involve bleeding, and in all of them a number of fowl are successively put in contact with the same supporting or holding surface. Consequently, holding devices on which any blood or other discharge or any vermin from one animal can collect and come into contact with another animal are apt to result in spreading contagion. It is impractical and inefficient to clean the supporting surface after each occupancy or operation on an individual fowl. My invention renders such cleaning unnecessary, and eliminates the danger of contagion, by skeletonizing the supporting surfaces of the holding structure so that each individual fowl is suspended with only its legs, or a minimum of the feathered part of its body, in contact with such surfaces, with all of the body of the animal hung free of the support so that all droppings will fall free of the structure and collect in a receptacle or on a pad located on the floor of the room. I regard this as an important feature of the invention.

The expeditious handling of a large number of fowl requires that the operator be relieved of the necessity of manually holding any of them against their natural tendency to extricate themselves, so that both hands of the operator will be free to hold and manipulate his instruments and prepare the appropriate area of the fowl. It is also desirable to arrange for mounting and removing the fowl by an assistant, so that the work can be divided between the operator and such assistant, with each performing his own task only. All this is accomplished by the present device, by providing secure holding means, adapted for instantaneous application to and removal from the fowl, on a support which can be rotated or otherwise moved between an operating station and a loading and unloading station at which the operator and his assistant take their respective positions.

In the case of many of the operations which must be performed on poultry, the time which a skilled operator requires to do his work on a fowl which is properly mounted and held motionless is very short. It is much shorter, in fact, than the time required to secure and release the fowl when the best of the prior art operating tables are used. Hence, in the use of such tables, when two persons divide between them the work of operating and securing and releasing the fowl, time is necessarily lost by the operator having to wait between operations for the assistant to remove a treated fowl and mount an untreated one. This waste of time is eliminated when the present invention is used because the work of securing and releasing each fowl, or loading and unloading the device with a plurality of fowl, is so simplified that it keeps pace with the work of even a very skilled and rapid operator.

With the foregoing and other objects and advantages in mind, a preferred embodiment of the present invention which has been used in actual practice and been found to give reliable and entirely satisfactory service is shown in the accompanying drawing and will be described and explained hereinafter. This embodiment, however, is capable of being modified within the spirit of the invention as pointed out by the appended claims.

In the drawing,

Figure 1 is a perspective view, partly broken away for economy of space, of a device embodying the invention;

Figure 2 is a detail vertical sectional view of the supporting member hub mounted in position on the standard;

Figure 3 is a perspective detail view of a portion of the rim of the device showing a fowl mounted in upright position;

Figure 4 is a similar view showing a fowl mounted in upside down position; and

Figure 5 is a detail top plan view showing, on a relatively enlarged scale, the manner in which a fowl-supporting chain or the like is detachably engaged with the supporting member.

Referring to the drawing, the preferred embodiment of the invention there illustrated includes essentially a supporting member mounted in a horizontal plane and provided with means for readily securing and releasing a fowl or a plurality of fowl. This member is conveniently mounted at any one of a plurality of vertically adjusted positions and is best made rotatable or otherwise movable so as to provide a loading and unloading station and an operating station between which the fowl may be moved, so as to bring them from the first station successively to the second station and thereafter back to the first.

To this end the device is best provided with a substantial base 11, here shown in the form of a fixed wheel composed of a rim 12 and a plurality of spokes 13 radiating from a hub 14, all made in a size large enough to give the structure stable support on the ground or a floor. Upstanding from the hub 14, and secured therein by readily released means such as the set screw 15, is a standard 16, provided in convenient height for holding, at any desired level, the supporting member which will now be described.

The member, designated generally 17, is best made in the form of a wheel, generally similar to the wheel 11 of the base, and comprising a peripheral rim 18 connected by spokes 19 to a hub 20 which is sleeved over the standard 16 for rotation and axial movement thereon. The height of the member may be fixed at any selected adjustment by setting a supporting bushing 21 at any desired elevation on the standard 16, which is conveniently accomplished by means of a set screw 22 threaded in the bushing and engageable with any one of a number of indentations or peripheral grooves 23 provided in the standard. The hub 20 may, if desired, be provided with a set screw 24 for holding it against rotation on the standard, but normally the member will be left free to be manually rotated on the standard.

At each of a plurality of more or less equally spaced points, such as the twelve shown in the illustrated embodiment of the invention, the rim 18 of the member is provided with a fixed, normally depending flexible element 25, each of them being some twelve inches or more in length and each being preferably secured to the rim by a swiveled connection. In the illustrated embodiment of the invention these elements are shown as chains in which each alternate link projects oppositely sidewise from the axis of the chain, so as to provide a plurality of spaced lateral enlargements, while the intervening links lie in another plane, normal to the first plane. In the appended claims these elements 25 are called "rope-like elements" which is intended generically to include all flexible strands, filaments or the like, a large number of different kinds of which can be used equivalently for the purpose of the chains shown at 25 in the preferred embodiment, as will be hereinafter explained.

Spaced laterally on the member, e. g., peripherally of the rim 18 in the illustrated embodiment, a short distance from the fixed end of each element 25, is means for securing to the member a terminal portion of the adjacent element 25 after its intermediate portion has been secured around a fowl. A preferred form of such means is simply a slot 26 formed in the rim and made deep enough and narrow enough to pass one link thereof and to hold the adjacent, laterally enlarged link. It will be observed, particularly from Figures 3 and 4, that any part of each chain or the like may readily be slipped into the adjacent slot and be held by the lateral projection of one of its links or equivalent enlargements.

In use of the device the intermediate portion of one of the chains is secured to a fowl in either of the positions shown respectively by Figures 3 and 4, after which the free end portion of the chain is secured to the rim in the manner that has been explained.

In Figure 3 the fowl is mounted by lifting its head and neck up through the opening between the rim 18 and two of the spokes 19 until the rim is seated between the animal's neck and wings. Then the intermediate portion of the chain 25 is slung under the wings and pllled up snugly so as to hold the shoulders of the bird up against the bottom of the rim. When a link in the free end portion of the chain is then inserted in the adjacent slot, as shown in Figure 3, the next adjacent link, which projects laterally from the chain, keeps the chain from pulling through the slot, and the fowl is securely mounted in upright position for any type of operation requiring such mounting. The fowl is securely restrained against any possibility of objectionable movement.

A fowl can be readily mounted in inverted position, as shown in Figure 4, by wrapping the intermediate portion of a chain 25 once or twice around the two legs of the bird and then catching the end portion of the chain in the adjacent slot. In this position the wings of the fowl are not restrained, but the lower portion of the animal is securely immobilized and held uppermost for any type of operation which requires such position.

It will be evident that the animal is readily released from either position by lifting the restraining chain from its slot.

Figure 5 shows the manner in which the chain fits into its slot in the rim 18. In this top plan view of the parts it will be observed that a link fits edgewise in the slot with the two adjacent links straddling the ends of the slot and overlapping the slot margins so that the chain cannot be pulled through the slot. Of course the chain is readily disengaged by lifting the link up out of the slot.

As has been stated, I prefer to employ chains as the rope-like elements 25, but I intend the broader claims to cover the full range of operative equivalents. It will be evident that I may substitute for the chains short lengths of rope provided with a series of spaced knots, or I might use leather or fabric straps having spaced studs projecting from them. Numerous other practical substitutes for the preferred chains will suggest themselves, and all are intended to be included within the comprehension of the expression "rope-like element" used in the claims. All such substitutes for the chains may be arranged to be engaged in the slots in the same way as the chain shown in Figure 5. However, within the scope of some of the broader claims, other modes of engagement, such as hooks and eyes or the like, may be provided.

As shown in the drawing, each of the slots 26 is best made somewhat inclined downwardly toward the fixed end of the chain or the like 25 which is to be caught in it. This inclination tends to seat the enlargement in the chain squarely across the slot and facilitate engagement and disengagement of the chain and slot.

As will be evident from Figure 1, the whole structure is skeletonized, and, as seen in Figures 3 and 4, the fowl are suspended, in either of their positions, with a minimum of their bodies in contact with the structure. It will also be noted that no part of the body of any fowl is positioned directly over any part of the supporting structure. Hence, droppings from the fowl, spilled treating substances and the like, have no chance of collecting on the structure and coming into contact with subsequently mounted fowl. Hence the device is sanitary in the extreme. If desired, a pad or receptacle may be positioned under the operating station for receiving droppings and the like.

In handling successively any considerable number of fowl, the operator and his assistant may stand at peripherally spaced locations about the rotatable support. The assistant may load and unload the fowl without interfering with the work of the operator, and the support may be rotated step by step to bring a new fowl up to the operating station and move a treated fowl back toward the loading and unloading station as fast as the work proceeds.

The arrangement by which the standard 16 can be detached from base 11 and from the member 17 permits the structure to be readily knocked down for shipment or storage.

Obviously the device may be made in any convenient dimensions and proportions.

I claim:

1. A holding device for live poultry and the like comprising an upright standard, a wheel having a rim and having a hub mounting the wheel horizontally for rotation on the standard, a plurality of rope-like elements fastened at circumferentially spaced intervals to the rim, normally depending therefrom, and each provided with a plurality of spaced enlargements, and a slot provided in the rim spaced circumferentially around the rim a short distance from each of said elements for receiving and holding a terminal portion thereof after an intermediate portion has been wrapped at least partially around a portion of a fowl, a selected one of said enlargements being disposed across the margins of the slot to keep the element from being pulled through the slot.

2. A holding device for live poultry and the like comprising an upright standard, a wheel having a rim and having a hub mounting the wheel horizontally for rotation on the standard, a plurality of chains fastened at circumferentially spaced intervals to the rim, normally depending therefrom, and each having laterally projecting links, and a slot provided in the rim spaced circumferentially around the rim a short distance from each of said chains for receiving and holding a terminal portion thereof after an intermediate portion has been wrapped at least partially around a portion of a fowl, a selected one of said links being disposed across the margins of the slot to keep the chain from being pulled through the slot.

CHARLES R. SIEGRIST.

REFERENCES CITED

The following references are of record in the file of this patent:

UNITED STATES PATENTS

| Number | Name | Date |
|---|---|---|
| 281,704 | Ladd | July 24, 1883 |
| 799,233 | Hubbell | Sept. 12, 1905 |
| 953,205 | Hughes | Mar. 29, 1910 |
| 1,265,016 | Williams | May 7, 1910 |
| 1,284,855 | Benn | Nov. 12, 1918 |
| 1,956,490 | Cannon | Apr. 24, 1934 |